2,801,112
VEHICLE WHEEL SUSPENSION MEANS

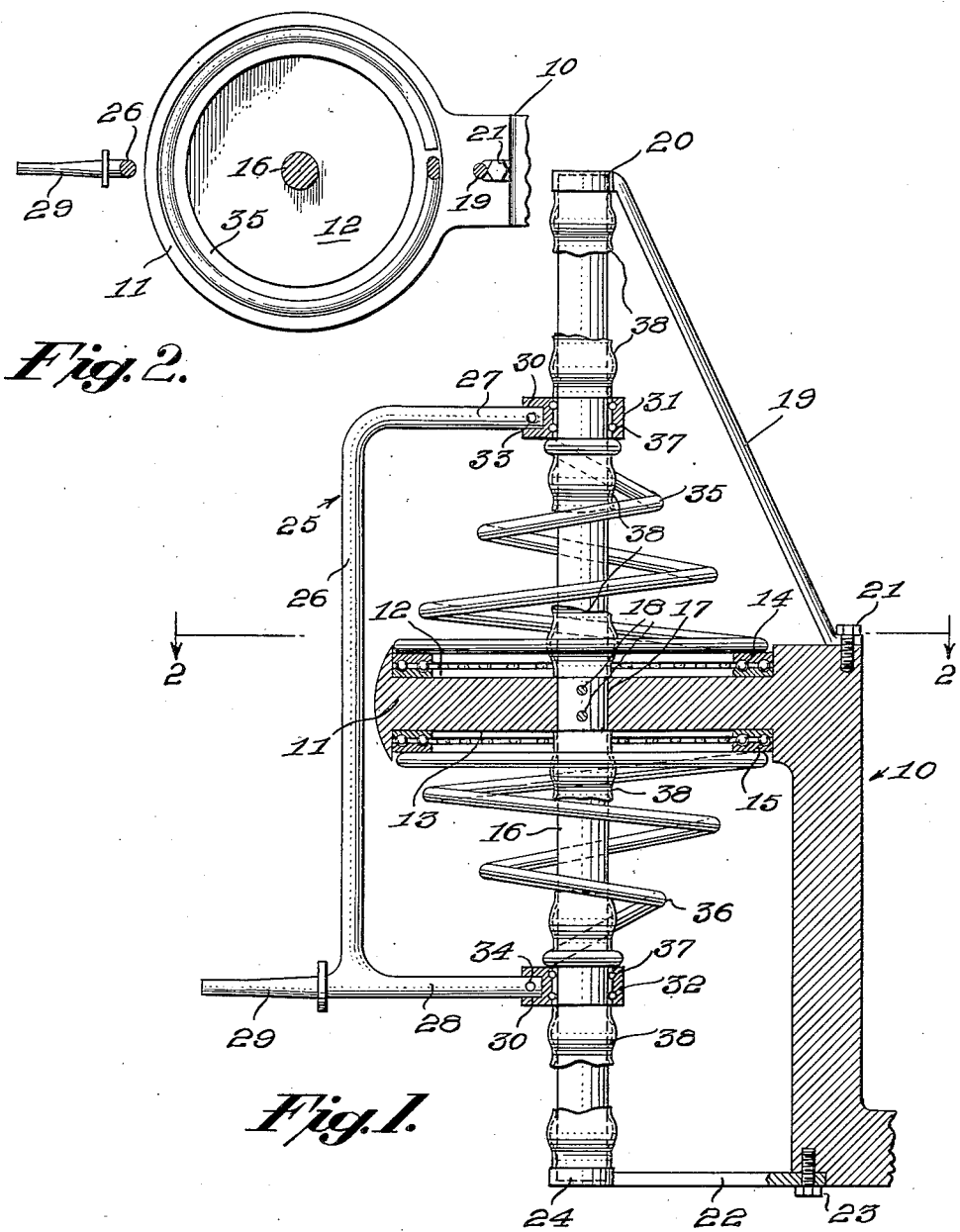

Melvin E. Piper, Altoona, Pa.

Application October 11, 1954, Serial No. 461,516

4 Claims. (Cl. 280—96.2)

This invention relates to a vehicle wheel suspension means.

The invention is more particularly concerned with a suspension means for steerable front wheels of motor vehicles and wherein the wheels are yieldably supported relative to a vehicle axle for a substantial range of vertical movement relative to the axle.

A primary object of the invention is to provide a yieldable suspension means for the steerable front wheels of motor vehicles which is of maximum sensitivity in action and which comprises a relatively small number of durable co-operating parts.

A further object of the invention is to provide a suspension means of the above noted general character which embodies means for protecting the more essential moving parts against the detrimental action of dirt and the weather elements.

Other objects and advantages of the invention will become apparent in the course of the following detailed description, taken in connection with the accompanying drawing, wherein—

Fig. 1 is a vertical sectional view, with some parts shown in elevation.

Fig. 2 is a horizontal sectional view as observed in the plane of line 2—2 on Fig. 1.

Referring now in detail to the drawing, wherein is disclosed a preferred structural embodiment of the invention, the end of a support or axle is indicated at 10 and same is provided with a horizontal bearing plate 11 whose upper and lower faces are provided with circular recesses 12 and 13 respectively. Disposed within the recess 12 is a circular ball bearing assembly 14 and disposed within the recess 13 is a ball bearing assembly 15.

A shaft 16 is disposed in vertical position with the central part thereof extending through an aperture 17 disposed centrally of the bearing plate 11 and rigidly secured therein by pins 18 extended through the plate 11 and the shaft 16.

The shaft 16 projects substantially equal distances above and below the bearing plate 11 and in order to brace same and maintain it in proper position under all conditions of use, a brace rod 19 is disposed in angular relation to the shaft and same is provided at its upper end with a cap 20 in which the upper end of the shaft is received, and the lower end of the rod is secured to the axle 10 as by means of a bolt 21.

A bar 22 is provided for bracing the lower end of the shaft and same has one end thereof rigidly connected to the axle 10 by means of a bolt 23 and the opposite end thereof is provided with a cap 24 which receives the lower end of the shaft.

A yoke 25 includes a vertical portion 26 outwardly of and parallel with the shaft 16 and upper and lower arms 27 and 28 extending toward the shaft in right angular relation to same and said vertical portion 26.

At the lower end of the vertical portion is an outwardly projecting wheel supporting spindle 29 in alignment with the arm 28. The yoke 25 is of course provided with any desired steering connection.

The ends of arms 27 and 28 extend into recesses 30 in upper and lower bearing blocks 31 and 32 respectively and are secured therein by pins 33 and 34, the former of which is preferably of an eccentric type as indicated by the dotted circular line for adjusting the yoke 25 and therewith the wheel supporting spindle 29.

Disposed between the roller bearing assembly 14 and the upper bearing block 31 is an upwardly tapered coil spring 35 and disposed between the roller bearing assembly 15 and the lower bearing block 32 is a downwardly tapered coil spring 36.

The springs normally maintain the bearing blocks in substantially equally spaced relation to the bearing plate 11 and same are rotatable with the bearing blocks 31 and 32 together with the yoke 25 in the steering action of a wheel.

The springs also provide for yieldable vertical movement of the yoke as upon engagement of a wheel mounted thereon with irregularities in a road bed.

The bearing blocks 31 and 32 are each preferably provided with shaft engaging bearings 37.

In order to preclude admission of foreign material to the shaft 16 same is preferably provided with expansible and contractible boots 38.

It will be seen from the above disclosure that the wheel supporting spindle 29 is supported by the end of axle 10 for rotation about an axis normal to the axle and for yieldable movement along the said axis and the yoke is capable of rotation about and bodily movement along the said axis simultaneously thereby providing a suspension means of maximum efficiency.

It is to be particularly observed that the upwardly and downwardly tapered springs 35 and 36 provide for a maximum range of vertical movement of the wheel supporting yoke 25 for the reason that the successive convolutions of the springs will nest in each other under maximum movement of the bearing blocks 31 and 32 toward the bearing plate 11, whereby the referred to sensitivity of the suspension means is realized.

While I have disclosed my invention in accordance with a single specific structural embodiment thereof, such is to be considered as illustrative only, and not restrictive, the scope of the invention being defined in the sub-joined claims.

What I claim and desire to secure by U. S. Letters Patent is:

1. A wheel suspension device comprising in operative association with an end of an axle, a bearing plate rigid with the axle and disposed in a plane parallel with the axis of the axle, a shaft extending centrally through the bearing plate and having its central portion rigidly secured thereto, a wheel supporting yoke mounted on the shaft for movement axially thereof and for rotation about the same, said yoke including bearing blocks at opposite sides of said bearing plate, a circular ball bearing assembly supported by each of the opposite sides of said bearing plate and an outwardly tapered coil spring at each side of said bearing plate with its relatively large base end engaged with the respective bearing assembly and its opposite relatively small end engaged with the respective bearing block.

2. A wheel suspension device comprising a bearing plate rigid with an end of a vehicle axle and being disposed in a plane parallel with the axis of the axle, a shaft extending centrally through the bearing plate and having its central portion rigidly secured thereto, said shaft being disposed normal to the bearing plate, means rigidly engaging opposite ends of the shaft and said axle for maintaining the shaft in operative position, a wheel supporting yoke mounted on the shaft for movement axially thereof and for rotation about the same, said yoke including bearing blocks at opposite sides of said bearing plate and through which said shaft extends, and spring means disposed between the bearing plate and the bearing blocks, said first mentioned means comprising a cap engaged over each end of the shaft, and an elongated member having one end thereof rigid with the cap and the other end thereof rigidly secured to the axle.

3. A wheel suspension device comprising a bearing plate rigid with an end of a vehicle axle and being disposed in a plane parallel with the axis of the axle, a shaft extending centrally through the bearing plate and having its central portion rigidly secured thereto, said shaft being disposed normal to the bearing plate, means rigidly engaging opposite ends of the shaft and said axle for maintaining the shaft in operative position, a wheel supporting yoke mounted on the shaft for movement axially thereof and for rotation about the same, said yoke including bearing blocks at opposite sides of said bearing plate and through which said shaft extends, and spring means disposed between the bearing plate and the bearing blocks, said yoke comprising a portion parallel with and in spaced relation to said shaft, and upper and lower parallel arms projecting from said portion at right angles thereto, said bearing blocks being provided with recesses in which the ends of said arms are disposed, and pins supported by said bearing blocks and extending through said recesses and the ends of the arms therein.

4. A wheel suspension device according to claim 3, together with a wheel supporting spindle rigid with said yoke and being co-axial with one of said arms and projecting oppositely thereto.

References Cited in the file of this patent

UNITED STATES PATENTS

| | | |
|---|---|---|
| 758,137 | Hicks | Apr. 26, 1904 |
| 1,034,497 | Pagliano | Aug. 6, 1912 |
| 1,118,761 | Griffith | Nov. 24, 1914 |
| 1,770,938 | Martin | July 22, 1930 |
| 1,815,231 | Brown | July 21, 1931 |
| 2,155,521 | Zavarella | Apr. 25, 1939 |
| 2,502,744 | Parker | Apr. 4, 1950 |